(12) United States Patent
Saposnik

(10) Patent No.: US 7,848,860 B2
(45) Date of Patent: Dec. 7, 2010

(54) MACHINE LOSS-OF-CONTROL DETECTOR AND SHUTDOWN SYSTEM

(75) Inventor: Fabio Saposnik, 35 Empress Avenue, Suite PH205 (2305), Toronto, Ontario (CA) M2N 6T3

(73) Assignee: Fabio Saposnik, Markham (CA)

(*) Notice: Subject to any disclaimer, the term of this patent is extended or adjusted under 35 U.S.C. 154(b) by 961 days.

(21) Appl. No.: 11/676,714

(22) Filed: Feb. 20, 2007

(65) Prior Publication Data

US 2007/0239328 A1   Oct. 11, 2007

Related U.S. Application Data

(60) Provisional application No. 60/774,602, filed on Feb. 21, 2006.

(51) Int. Cl.
   *G06F 19/00*   (2006.01)

(52) U.S. Cl. .............................. 701/29; 701/31; 701/50; 701/36

(58) Field of Classification Search ...................... 701/1, 701/29, 31, 33, 36, 50; 414/1–8; 180/271–282
See application file for complete search history.

(56) References Cited

U.S. PATENT DOCUMENTS

| | | | |
|---|---|---|---|
| 2,926,223 A | 2/1960 | Netterfield | |
| 3,882,957 A | 5/1975 | Fritz | |
| 4,221,530 A | 9/1980 | Williams, IV et al. | |
| 5,249,422 A | 10/1993 | Smith et al. | |
| 5,787,374 A | 7/1998 | Ferguson et al. | |
| 6,032,094 A | 2/2000 | Yanagi et al. | |
| 6,240,351 B1 | 5/2001 | Hou et al. | |
| 6,292,759 B1 | 9/2001 | Schiffmann | |
| 6,397,133 B1 | 5/2002 | van der Pol et al. | |
| 6,612,394 B2 * | 9/2003 | Wessman | 180/446 |
| RE38,632 E | 10/2004 | Schmidt et al. | |
| 6,804,599 B1 | 10/2004 | Burnett | |
| 6,814,173 B2 | 11/2004 | Wielenga | |
| 7,014,006 B2 * | 3/2006 | Wielenga | 180/277 |
| 2003/0217883 A1 | 11/2003 | Wielenga | |

* cited by examiner

*Primary Examiner*—Richard M. Camby
(74) *Attorney, Agent, or Firm*—Gowling Lafleur Henderson LLP

(57) ABSTRACT

A method and system are described for machine loss of control detection. In one aspect, the method and system detect operator intended motion of the machine or a part of it and actual motion of the machine or a part of it; and determine machine loss of control in response to whether actual motion is materially different from operator intended motion. Actual motion is determined from angular motion signals from a gyroscopic angular sensor and, optionally, linear motion signals (e.g. acceleration via one or more accelerometers). Machine loss of control determination may be used to stop the actual motion (e.g. stopping power or fuel an engine, bypassing hydraulic fluid flow, etc). The method and system are adaptable to machines having one or more driving and actuating systems capable of malfunctioning in such a way as to cause the machine to move uncontrollably.

24 Claims, 2 Drawing Sheets

Figure 1: System Block Diagram
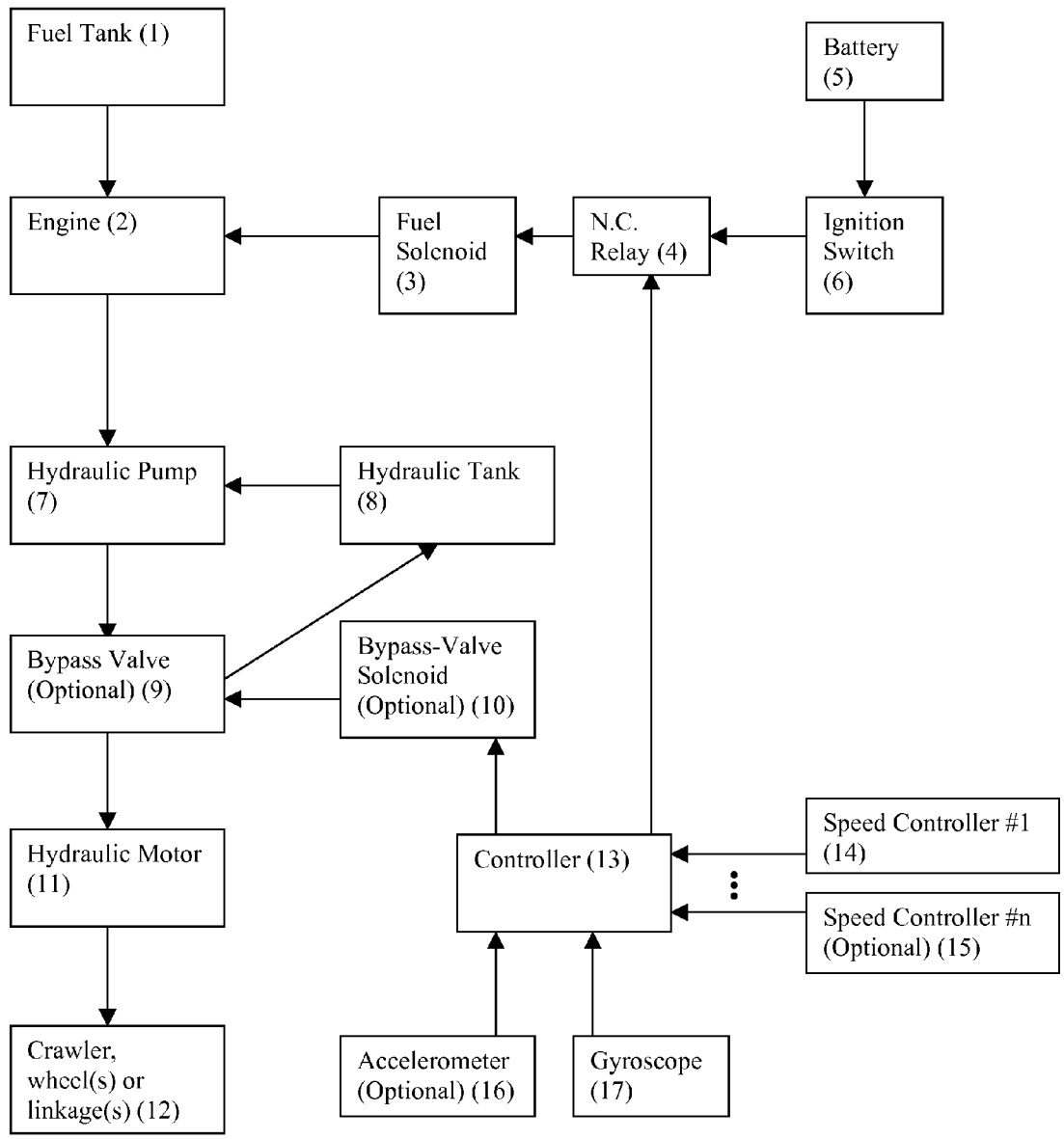

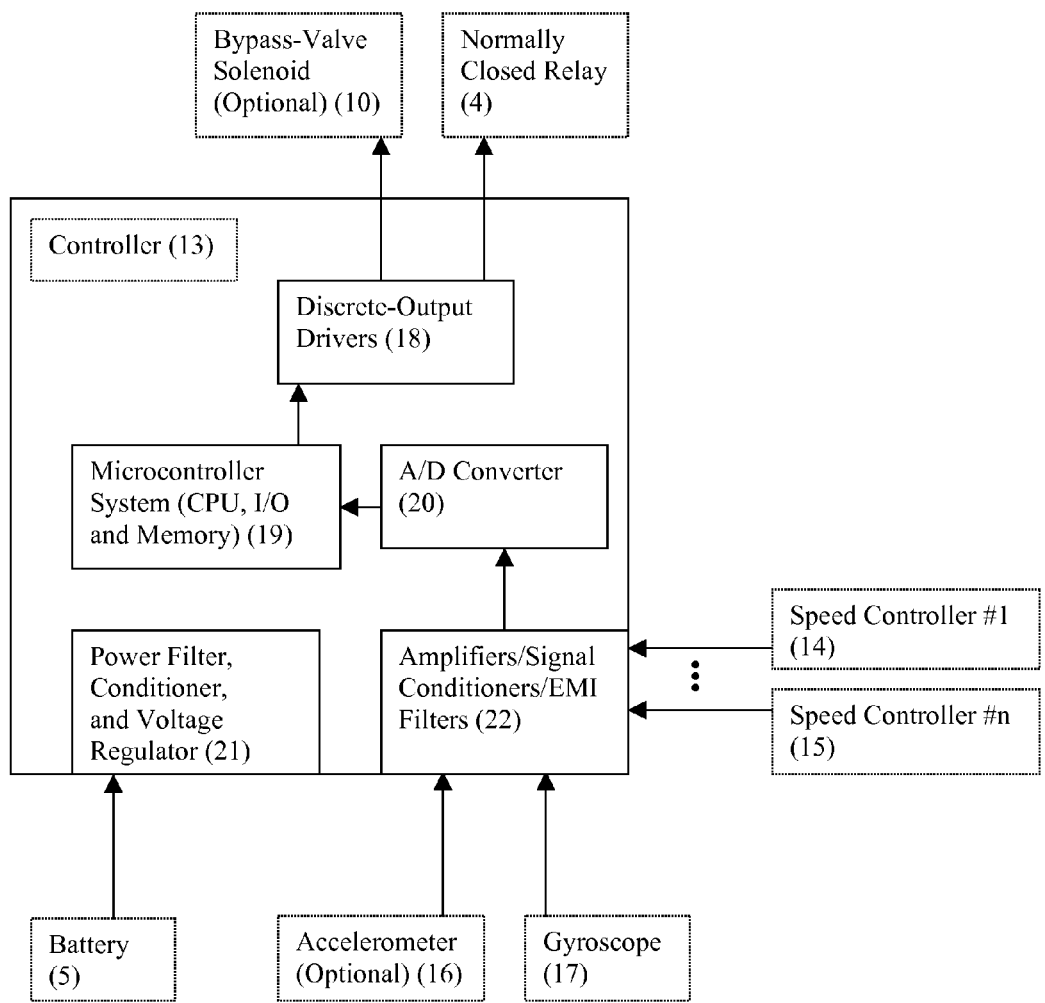
Figure 2: Controller Block Diagram

US 7,848,860 B2

MACHINE LOSS-OF-CONTROL DETECTOR AND SHUTDOWN SYSTEM

CROSS-REFERENCE

The present application claims the benefit of Provisional U.S. Patent Application No. 60/774,602 filed Feb. 21, 2006.

COPYRIGHT

A portion of this specification contains material that is subject to copyright protection. The copyright owner has no objection to the facsimile reproduction by anyone of the patent document, as it appears in the Patent and Trademark Office patent file or records, but otherwise reserves all copyrights whatsoever.

FIELD

The present application relates to machine loss-of-control detection and shutdown for machines having one or more driving and actuating means capable of malfunctioning in such a way as to cause the machine to move uncontrollably.

BACKGROUND

Some machines, such as asphalt pavers and log loaders, comprise one or more driving and actuating systems where the operation, particularly speed and direction (e.g., forward and reverse, left and right, in and out, up and down), of each driving and actuating system is separately controlled. Each driving or actuating system often comprises a hydraulic pump for driving—either directly or through a valve—a motor, cylinder or actuator that is coupled to a crawler, wheel(s), linkage(s) or rotating platform. In other cases the driving and actuating systems include an electric motor, the application of electric power to which is controlled by means of switches.

Such machines thus have speed controllers; in some cases, there is a separate speed controller—e.g. a joystick—for different functions of the machine; in other cases, one controller determines the forward speed of the machine, and another determines the deviation from straight-ahead, i.e. the desired angular speed or rate of yaw. The latter may be, for example, a steering wheel or a knob. In yet other cases machines, such as knuckle-boom log loaders, use resolved motion control whereby one controller determines the horizontal speed of an end effector, such as a grapple or bucket, and another determines its vertical speed. The speed commands for each driving and actuating system of the machine are derived from these controllers.

When a hydraulic component malfunctions, e.g. because a swash-plate or spool gets stuck in the open position, or because a switch is welded shut by arcing, it is possible for the hydraulic or electric component to keep applying power to an actuator, crawler or wheel, even when electric power to the control element of said component is turned off.

Devices exist, for example in cars, which detect a machine skidding or rotating uncontrollably, and then modulate power to a wheel or wheels to counteract the problem. They are known, for example, by names such as anti-lock brakes (ABS), electronic-stability programs (ESP) and traction-control systems. These devices deal with problems of machine inertia and/or lack of friction between the machine tires and the ground. They rely on the machine systems being functional, so that the system controller may use the brakes, for example, to alleviate or solve the problem. Thus they do not address the problem of a component failure.

Other devices exist that detect a motion that is forbidden and react to it, such as heater-fans that are shut down when the unit tips over. Thus they do not distinguish between motion that is permissible in one context but not another.

Yet other devices detect a problem in a machine, such as the engine oil pressure being too low, and then shut the engine down. These react to the internal behaviour of the machine, rather than to the machine's behavior in its environment.

It is thus desired to have a machine loss-of-control detection and shutdown system that addresses one or more of these shortcomings. A solution that is reliable, easy to implement, and relatively inexpensive is highly desired.

SUMMARY

A method and system are described for machine loss of control detection. In one aspect, the method and system detect operator intended motion of the machine or a part of it and actual motion of the machine or a part of it and determine machine loss of control in response to whether actual motion is materially different from operator intended motion. Actual motion is angular motion indicated by a gyroscopic angular motion sensor and/or linear motion indicated by one or more accelerometers. Machine loss of control determination may be used to stop the actual motion (e.g. stopping power or fuel to an engine, bypassing hydraulic fluid flow, etc). The method and system are adaptable to machines having one or more drive and actuating systems driven by independent speed controls.

The method and system seek to address a problem associated with uncontrollable machine motion caused by an internal failure in the machine, as opposed to problems of inertia or lack of traction, where the motion is of a type and range that would be normal—except that the operator does not intend it. Also, the method and system primarily relate the actual movement of the machine to that which was expected, not to measurements internal to the machine.

BRIEF DESCRIPTION OF THE DRAWINGS

In order that the subject matter may be readily understood, embodiments are illustrated by way of examples in the accompanying drawings, in which:

FIG. 1 is a block diagram of pertinent components for driving one side or function of a machine in accordance with an embodiment of the invention; and FIG. 2 is a block diagram of a controller in accordance with an embodiment of the invention.

DETAILED DESCRIPTION

The basic elements in the system involve: detecting actual motion (directly or indirectly), detecting operator intended motion and determining machine loss-of-control when actual motion and operator intended motion are materially different. Negligible differences may be ignored. One or more thresholds may be developed to indicate the material differences. Action may be taken to stop machine motion in response to the loss-of-control detection in accordance with the configuration or other parameters of the machine as described further herein below.

Detection of Machine Motion

Machine motion may be detected by sensors such as gyroscope(s) to detect angular motion, such as yaw and accelerometer(s) to detect acceleration such as a machine speeding up, or it not slowing down when the commands to its motors, valves or pumps would indicate otherwise. In machines that are propelled by two crawlers, for example, two accelerometers may be used to detect when each side of the machine is behaving unexpectedly—e.g. because one crawler is (or both are) out of control. An accelerometer is a device that outputs a voltage that is proportional to its own acceleration. Examples of suitable accelerometers for the purposes herein are Micro Electro-Mechanical Systems (MEMS), piezoelectric, shear mode, capacitive spring mass based and Surface Acoustic Wave (SAW) accelerometers.

A gyroscope or a pair of accelerometers may be mounted in a location removed from the traction means of the machine or vehicle, and as such are easier to retrofit and more reliable than, and preferable to, other sensor types such as Hall-effect sensors, magnetic pick-up sensors, potentiometers and resolvers. The latter are located such that they are physically coupled to the traction or propulsion means, and are exposed to the weather and road hazards, such as rocks and salt spray; this also necessitates wires to be routed to such exposed locations, which makes them vulnerable to damage and the installation more laborious, potentially requiring disassembling or modifying part of the machine or the propulsion means. Alternatively, the latter sensors and wires may be protected from these hazards by heavy-duty enclosures or coupling means, which increases the cost of the installation. A gyroscope or a pair of accelerometers can be located in a protected part of the machine or vehicle, which makes the installation more reliable, easier to implement, and less costly.

Determination of Expected Motion

Operator intended motion might be determined by sensors reading operator controlled control inputs, such as joysticks that control speed: this may involve reading the actual magnitude of a command or simply detecting a null-command, e.g. when joysticks are positioned in a neutral or centered location. Control output signals to actuators may also be read as an indication of operator intent, reading a control voltage or current being supplied to the solenoid of a valve, pump or motor. As well, other operator controls indicating operator intended motion may be detected such as a stop command from the operator: this may include a master-disable switch that the operator controls.

An operator might be controlling the machine directly, for example via an operator control system located in it, or indirectly by remote control system; the control system might control directly the function of the machine or control a desired end result, such as machine trajectory, via a controller that resolves the desired end result into individual speed commands for each function of the machine.

Comparison of Actual Motion to Operator Intended Motion

The comparison between what the motion is, and what it is expected to be (i.e. intended by an operator), can be done by a control module that detects machine motion and determines what the expected motion is. If there is a discrepancy larger than a pre-determined threshold, this controller can act to stop the actual motion, disabling the machine or rendering ineffective the faulty actuator. Step(s) to disable or shutdown may be delayed and taken only when to the loss-of-control persists for a predefined length of time.

An Implementation

In this sample implementation the system might be concerned with reacting to the malfunction of one or two pumps that control the linear translation and rate of yaw of a machine. This might be the case, for example, of an asphalt paver that is propelled and steered by two crawlers, one on each side of the machine.

The controller consists of a micro-controller based system, an A/D converter, signal conditioners, and power drivers such as depicted in FIG. 2.

The sensor used to detect machine motion is preferably a solid-state gyroscope. The controller also reads operator commands generated by the joysticks that control the machine.

The microcontroller reads the rate of yaw of the machine using the gyroscope. If an angular velocity with a magnitude greater than a preset threshold, e.g. ±3°/sec, is detected when the operator command signal is about zero, and this condition persists for longer than a preset length of time, e.g. 1 sec, then the microcontroller causes the engine to shut down, such as by removing power from its fuel solenoid.

This implementation detects when the machine is rotating when it should not be. It would be possible for the machine to move uncontrollably without rotating, e.g. if two pumps failed on it; such a scenario would not be detected by a gyroscope. To deal with this, an accelerometer may be added, that the controller would use to detect machine translation.

A special case of this situation would involve the machine already moving at maximum speed, and then the speed controllers being centered: If the machine failed to decelerate, the controller would react to a lack of deceleration as it would to unwarranted acceleration—be it linear or angular, i.e. it would act to stop machine motion.

In general, variations on this scenario, whereby the control module acts to disable the machine, may include:

In a machine including a hydraulic pump that drives—directly or through a valve—a hydraulic motor to propel a crawler, cylinder or actuator:

The microcontroller energizes a valve that bypasses the hydraulic pump flow, starving the motor, cylinder or actuator. In this way, even if the pump, valve, motor or actuator are stuck open, the crawler, linkage or platform driven by it will stop. This could be implemented externally to the pump, by a valve diverting flow from the pump outlet to its inlet or to the hydraulic tank, or by a valve allowing flow from one port of the pump to another—e.g. from port A to port B.

The microcontroller stops the engine, e.g. by energizing a solenoid that bypasses fuel flow to it, by energizing a relay that disconnects electric power to the spark plugs (if it is not a Diesel engine), and/or by de-energizing a fuel solenoid that feeds fuel to the engine.

In a machine powered by electric motors:

The microcontroller cuts the electric power supply to the motor and its control system. (In this scenario, the machine not being controllable may stem from a failure in the main control system, or in an output device within it.)

Sample System Block Diagram

FIG. 1 is a block diagram illustrating, by way of example, pertinent drive and control components for one side of a machine that is propelled and steered by two crawlers—one on each side. Pump, bypass valve and its solenoid (if they are installed), motor and crawler components for an opposite side are not shown.

In the machine described, the engine (2) draws fuel from the fuel tank (1); this action is controlled by the fuel solenoid (3), which must be energized to enable fuel to flow to the engine (2). A battery (5) through an ignition switch (6) typically provides power to the fuel solenoid (3). In accordance with an embodiment of the invention, a normally-closed relay (4) is added in series, between the output of the ignition switch (6) and the fuel solenoid (3); this relay allows the controller (13) to shut off fuel flow to the engine (2), causing it to stop and disabling the machine.

In an alternative approach, which can be used in conjunction to that described above for redundancy, or in its stead, a bypass valve (9) is added to the existing machine. In the event that the hydraulic pump (7) still delivers oil to the hydraulic motor (11) when the operator wants the machine to stop, e.g. as evidenced by the speed controllers (14) and (15) being centered, the controller (13) can energize the bypass-valve solenoid (10). This diverts the flow of oil stemming from the hydraulic pump (7) back into the hydraulic tank (8), bypassing the hydraulic motor (11), thus starving it of oil, and causing the machine to stop.

The controller (13) decides whether or not to stop the machine based on the output from the gyroscope (17) and the speed controllers (14) and (15). For example, the output from the controller (13) will be activated if the speed controllers are centered, meaning that the machine should stop, but the machine is turning, i.e. it has a non-zero angular speed as measured by the gyroscope (17).

A typical machine, such as an asphalt paver, will have a single engine, but two hydraulic systems, each driving one side of the machine, and each including a pump and motor. In such a case, one bypass valve would be added to each side.

FIG. 2 illustrates an example controller (13) in greater detail. Within the controller (13), the signals from the gyroscope (17) and accelerometer (16), if one is installed, are modified by the amplifiers/signal conditioners/EMI filters (22), so that they are suitable to be read by the A/D converter (20). The signals from the speed controllers (14) and (15) are similarly modified, except that they will typically require attenuation rather than amplification. The power filter, conditioner and voltage regulator (21) modifies the voltage obtained from the machine's charging system (battery and alternator) so it is suitable for an electronic module.

The microcontroller system (19) executes the program, reads the A/D converter (20), makes a decision as to whether or not to activate its outputs, and controls the discrete-output drivers (18) accordingly. The latter will typically be solid-state high-side drivers, with an output current capacity of 1.5 A or higher.

Program Description

The following describes an example of the program executed by the Controller (13), using pseudo-code. In it, reference is made to an alarm and shutdown indicators. These are optional devices, which may be used to inform the operator of the reason for the machine having stopped.

```
Start
De-activate outputs          /*enable machine motion           */
Initialize
Read speed controllers       /*operator intended motion inputs */
Read machine angular speed   /*actual motion                   */
Read acceleration            /*actual motion                   */
Calculate desired angular speed  /*operator intended motion    */
Calculate desired acceleration   /*operator intended motion    */
If (|desired angular speed − calculated angular speed| > threshold_1) or
   If (|desired acceleration − calculated acceleration| > threshold_2) then
   /* machine loss-of-control determined, take steps to disable and
      indicate: */
      Activate output(s) to stop machine movement
      Activate alarm and shutdown indicator output(s)
End
```

Program Variations

The program may be modified, for example, so as not to calculate the desired angular speed or acceleration, but rather whether they are positive, negative or zero. The decision to stop machine movements would be reached if the actual angular speed or acceleration differs in sign from the respective desired values or if they are supposed to be zero but are larger (in absolute value) than a predetermined threshold.

Machine loss-of-control may not be raised on an initial material difference of actual motion and operator intended motion determination. Loss-of-control may be further responsive to a persisted or repeated difference; for example, where the material difference persists over a predetermined period of time to allow the operator's commands to normally propagate through the machine's drive system and not raise false alarms.

Though not shown in the pseudo-code, delays (whether implemented in software and/or hardware) may be employed to match operator commands (i.e. reading speed controllers) with machine responses (i.e. reading actual motion) so as to allow the machine to react normally.

Hardware Variations

The controller (13) output may be implemented, instead of using discrete power drivers, by way of a data bus interface or data link interface. In such a case, when the controller acts to disable the machine, it might do so by sending a command on the data bus or data link, e.g. to the engine controller to stop the engine. This hardware variation would impact the software as well, which would require implementation of the data bus or data link protocol.

Some pumps provide a pump output signal to indicate when and/or the degree to which the pump is open, for example, indicating when a swash plate for controlling pump flow is off-centre (i.e. open). An inference that the machine is moving when the pump is open may be made and that movement is likely uncontrolled. In an embodiment (not shown) including such a pump (7), the pump output signal may be coupled to an input of controller (13) to provide a signal to detect actual pump function. As well, controller 13 may be coupled to monitor a pump control signal for controlling the pump to detect intended pump function, determining when the pump control signal instructs the pump to close. Machine loss-of-control may be further responsive to the pump output signal and, optionally, the pump control signal. Loss of control may be indicated when the pump output signal indicates that the pump is open yet the operator's speed controller is centered or the pump control signal is instructing the pump to close. A suitable delay to allow the pump to respond to the pump control signal may be taken.

Those of skill in the art may effect alterations, modifications and variations to the particular embodiments without departing from the scope of the application. The subject matter described herein in the recited claims intends to cover and embrace all suitable changes in technology.

What is claimed is:

1. A method of machine loss of control detection comprising:

detecting operator intended motion of the machine or a part of it;

detecting actual motion of the machine or the part of it; and determining machine loss of control in response to whether actual motion is materially different from operator intended motion;

wherein the step of detecting actual motion is responsive to angular motion signals from a gyroscopic angular sensor and, optionally, linear motion signals from at least one accelerometer.

2. The method of claim 1 further comprising the step of indicating said machine loss of control.

3. The method of claim 1 further comprising the step of stopping said actual motion in response to said step of determining machine loss of control.

4. A system for determining machine loss of control comprising:
 a controller having a plurality of inputs for receiving indications of operator intended motion of the machine or a part of it and actual motion of the machine or a part of it and at least one output, said controller configured to detect said operator intended motion and actual motion and determine machine loss of control in response to whether actual motion is materially different from operator intended motion;
 wherein, for detecting the actual motion, at least one of said inputs receives angular motion signals from a gyroscopic angular sensor and, optionally, at least one of said inputs receives linear motion signals from at least one accelerometer.

5. The system according to claim 4 wherein the controller is configured to indicate said loss of control via said at least one output.

6. The system according to claim 5 wherein at least one output is coupled to at least one control mechanism for stopping said actual motion.

7. The system according to claim 4 comprising a gyroscopic angular motion sensor coupled to one of said inputs for indicating actual motion of the machine or a part of it.

8. The system according to claim 7 comprising at least one accelerometer sensor coupled to a respective at least one of said inputs for indicating actual motion of the machine or a part of it.

9. The system according to claim 7 comprising at least one of:
 a control mechanism coupled to one of the outputs to stop a flow of fuel or electrical current to an engine of the machine;
 a control mechanism coupled to one of the outputs to stop a flow of hydraulic fluid to a hydraulic motor of the machine configured to drive the machine or a part of it; and
 a control mechanism coupled to one of the outputs to stop a flow of electric current to an electric motor of the machine configured to drive the machine or a part of it.

10. A computer program product comprising a computer readable medium storing instructions and data for configuring a controller to execute operations for performing the method according to claim 1.

11. A method of machine loss of control detection for a machine, the method comprising:
 detecting operator intended speed and at least one of actual angular speed and,
 optionally, actual acceleration;
 for each one of actual angular speed and actual acceleration detected:
  computing respectively operator intended angular speed and operator intended acceleration; and
  determining machine loss of control in response to whether actual angular speed and actual acceleration are respectively materially different from operator intended angular speed and operator intended acceleration; and wherein said machine comprises at least one of:
 a pair of drives on opposite sides of the machine driven by independent speed controls;
 a plurality of drives on opposite sides of the machine driven by independent speed and steering controls; and
 one or more movable linkages driven by independent speed controls; and
wherein said steps of detecting, computing and determining are performed for a respective drive or linkage.

12. The method according to claim 11 comprising the step of indicating machine loss of control.

13. The method according to claim 11 comprising the step of stopping machine movement in response to the step of determining machine loss of control.

14. The method according to claim 13 wherein the step of stopping comprises at least one of:
 stopping a flow of fuel or electrical current to an engine of the machine;
 stopping a flow of electrical current to an electric motor of the machine;
 stopping a flow of hydraulic fluid to an actuator of the machine configured to drive a linkage of the machine; and
 stopping a flow of hydraulic fluid to a hydraulic motor of the machine configured to drive the machine.

15. The method according to claim 11 wherein the step of determining machine loss of control comprises comparing a difference of actual and operator intended values and a respective threshold.

16. The method according to claim 11 wherein the step of computing operator intended angular speed and operator intended acceleration comprises computing a sign for each respective value and wherein the step of determining machine loss of control comprises determining whether actual angular speed and actual acceleration differ in sign.

17. The method according to claim 11 wherein the step of detecting operator intended speed comprises reading speed controller outputs that are responsive to operator actions.

18. The method of claim 11 wherein the machine comprises a pump having a pump output signal indicating whether the pump is open, said method comprising receive said pump output signal and determining said loss of control in response to said pump output signal.

19. The method of claim 11 wherein the machine comprises at least one of a gyroscopic angular sensor for detecting the angular motion of the machine or a part of it; and a pair of accelerometers for detecting acceleration of the machine or a part of it.

20. A system for machine loss of control detection, the system comprising:
 at least one of: a gyroscopic angular sensor for detecting the angular motion of the machine or a part of it; and at least one accelerometer for detecting acceleration of the machine or a part of it; and
 a controller adapted to receive speed control inputs for the machine or the part of it and sensor signals of the at least one gyroscopic angular sensor and accelerometer, said controller further adapted to:
  determine operator intended speed and at least one of actual angular speed and actual acceleration;
  for each one of actual angular speed and actual acceleration determined:
   compute operator intended angular speed and operator intended acceleration; and
   determine machine loss of control in response to whether actual angular speed and actual acceleration are respectively materially different from operator intended angular speed and operator intended acceleration; and wherein the machine comprises one of: a pair of drives on opposite sides of the machine driven by independent speed controls; a plurality of drives on opposite sides of the machine driven by independent speed and steering controls; and one or more movable linkages driven by independent speed controls.

21. The system according to claim 20 wherein the controller is configured to output a signal to stop machine movement in response to determining machine loss of control.

22. The system according to claim 21 wherein the controller is coupled to output the signal to at least one of:

a control mechanism to stop a flow of fuel or electrical current to an engine of the machine;

a control mechanism to stop a flow of electrical current to an electric motor of the machine;

a control mechanism to stop a flow of hydraulic fluid to an actuator of the machine configured to drive a linkage of the machine; and a control mechanism to stop a flow of hydraulic fluid to a hydraulic motor of the machine configured to drive the machine.

23. The system according to claim 20 wherein the machine comprises a pump having a pump output signal indicating whether the pump is open and wherein the controller is configured to receive said pump output signal and determine said loss of control in response to said pump output signal and said operator intended speed.

24. A computer program product comprising a computer readable medium storing instructions and data for configuring a controller to execute operations for performing the method according to claim 11.

* * * * *